Patented Mar. 30, 1926.

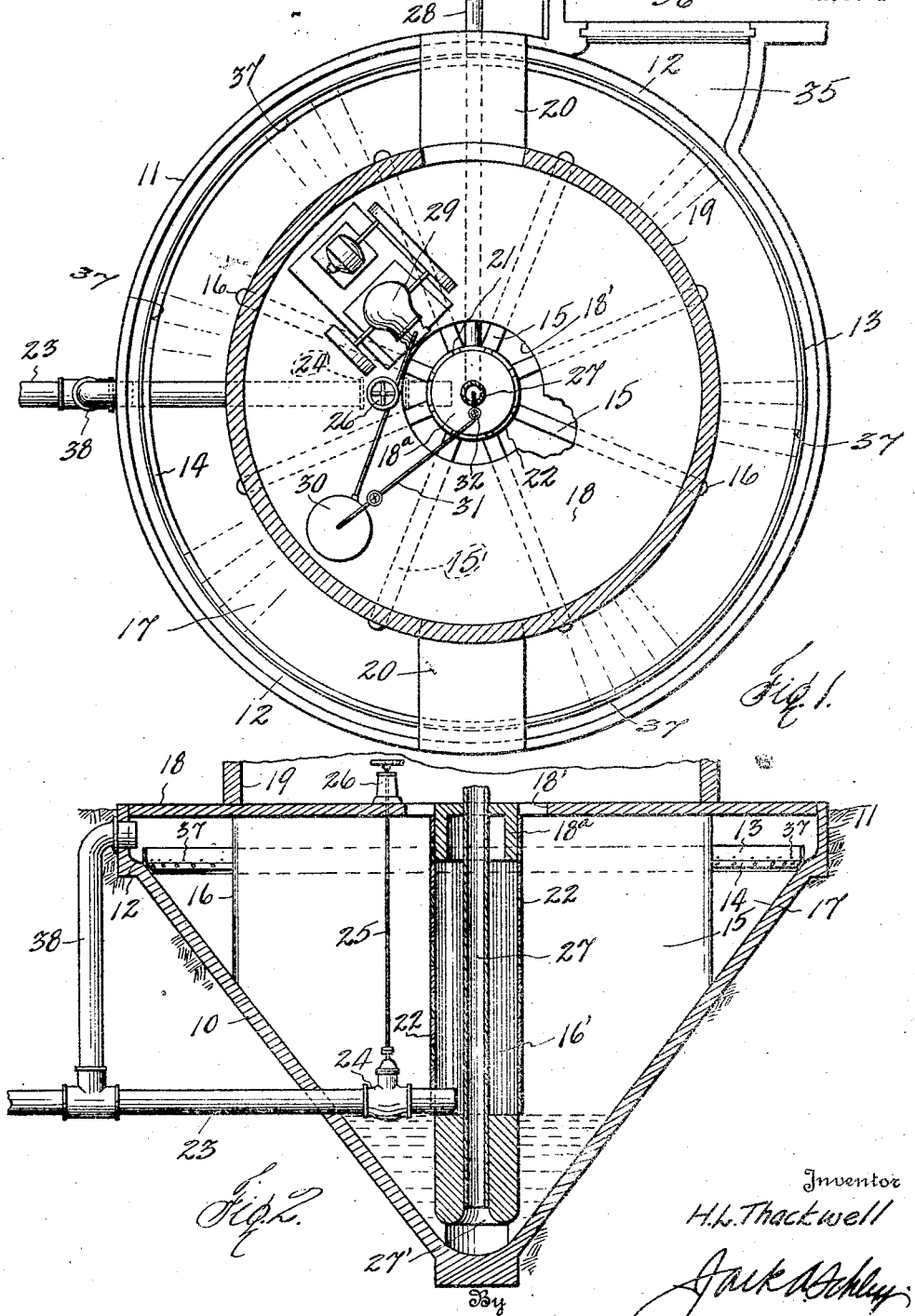

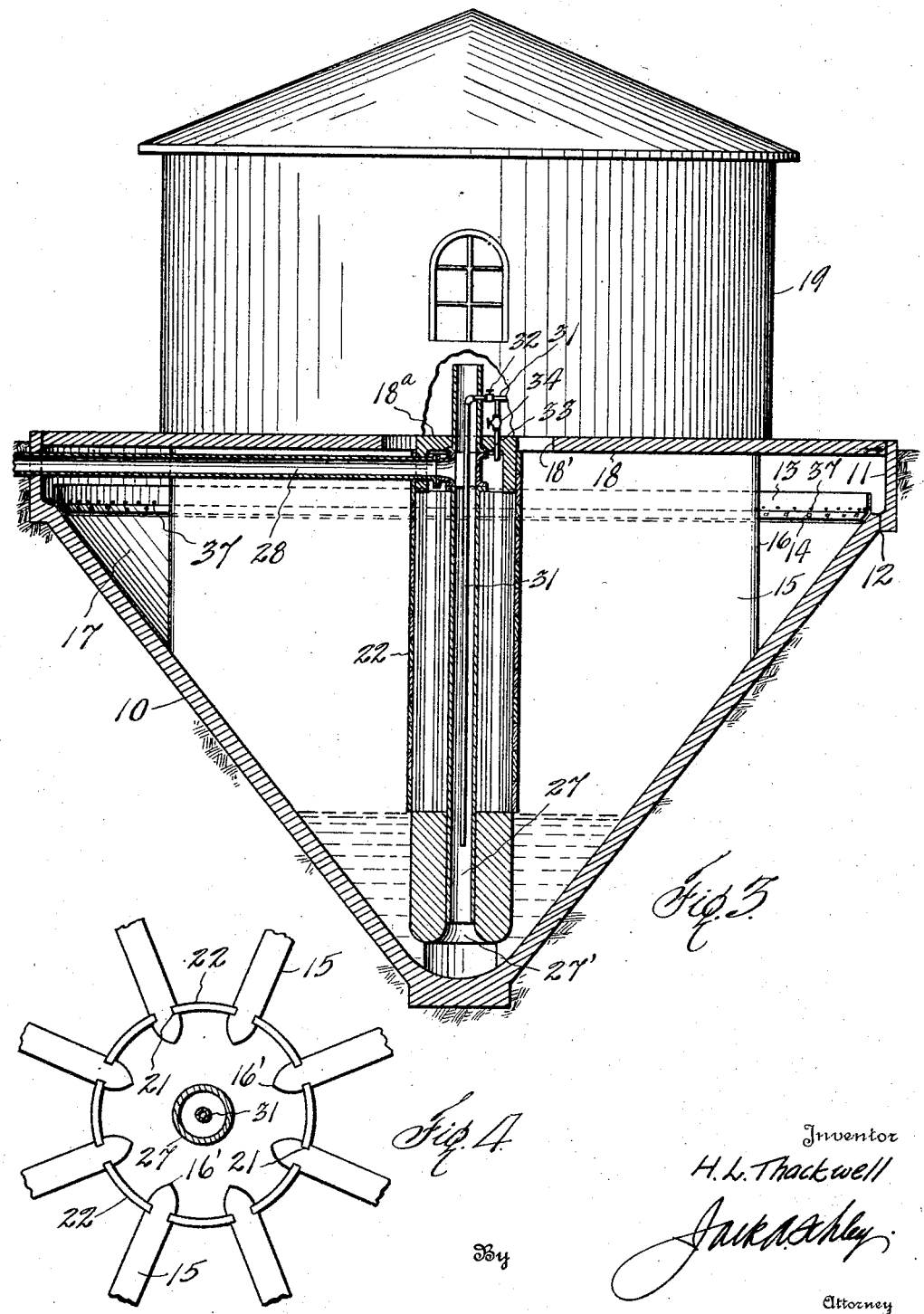

1,578,691

UNITED STATES PATENT OFFICE.

HENRY L. THACKWELL, OF DALLAS, TEXAS, ASSIGNOR OF ONE-HALF TO FRED A. JONES, OF DALLAS, TEXAS.

SEWAGE AND WATER CLARIFYING TANK.

Application filed April 16, 1925. Serial No. 23,442.

*To all whom it may concern:*

Be it known that I, HENRY L. THACKWELL, citizen of the United States of America, residing at Dallas, in the county of Dallas and State of Texas, have invented certain new and useful Improvements in Sewage and Water Clarifying Tanks, of which the following is a specification.

This invention relates to new and useful improvements in sewage and water clarifying tanks.

The object of the invention is to simplify and reduce the expense of clarifying sewage and water, by performing the functions of sedimentation and filtration with a single unit and without the use of complex devices.

A particular object of the invention is to spray or direct radially and horizontally the effluent from the aeration tank, toward the center of the clarification tank, whereby the velocity is reduced, so that suspended solids are deposited as sludge in the bottom of the tank; together with means for directing the effluent toward the center of the tank thus preventing wandering and indirect currents.

Another object of the invention is to direct the effluent horizontally against the face of a vertically disposed filtering column, whereby more rapid and efficient filtration is carried out and whereby the filtering column is more readily cleansed.

A further object is to arrange the filtering plates in superimposed order whereby they may be readily placed and replaced and economically maintained.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is a plan view of a tank constructed in accordance with my invention,

Fig. 2 is a partial vertical sectional view.

Fig. 3 is a vertical sectional view at right angles to Fig. 1, and

Fig. 4 is a detail of the filter plate mounting.

In the drawings the numeral 10 designates an inverted conical or pyramidal tank having short vertical walls 11 at its upper end and built of reinforced concrete or any other material suitable for the purpose. The tank at the intersection of its conical portion and its vertical wall is shouldered to form an annular gutter 12, fenced by an upright metallic curb 13 having a depending apron 14 extending below the shoulder and bolted or otherwise secured to the tank wall.

Vertical guide walls or vanes 15 are built radially in the tank and have their edges 16 rounded and terminating short of the gutter to form a flow moat 17 therebetween. The inner vertical edges 16′ of the vanes terminate in circular order to form a central well. A circular platform 18 is built on the vanes and supports a machinery house 19 which is reached by two bridges 20 extending across the moat 17. The platform has a central opening 18′ at the top of the well, the well being closed by a cap 18ª.

Vertical slots 21 are formed in the sides of the vanes near the edges 16′ and extend down to the sludge level line. Arcuate filter plates 22 made of "filtros" or any other suitable filtering material are superimposed in these slots between the vanes and form a vertical column surrounding the well. The central opening 18′ is larger in diameter than the filtering column so that the plates may be cleaned with wire brushes if desired. A discharge pipe 23 leads from the well immediately above the sludge level for conducting filtered effluent and includes a gate valve 24 having an operating rod 25 extending up to a stand 26 in the house 19. The tank below the filter column forms a sludge hopper.

A sludge discharge pipe 27 extends axially of the well and is supported in a ring 27′ at the bottom thereof, and is connected to a lateral discharge pipe 28 extending under the platform 18 and through the wall 11. An air compresser 29 in the house is connected with an air receiver 30 from which a pipe 31 leads and extends down into the pipe 27 and terminates below the sludge level. This pipe 31 includes a valve 32. A cleaning line 33 including a valve 34 extends from the pipe 31 through the cap into the upper end of the filtering column for cleaning the plates. By means of the air lift the sludge is elevated in pipe 27 and discharged through pipe 28.

A sluice extends from the wall 11 to a weir 36 at a suitable aerator, by which the effluent flows to the gutter 12. The curb has regularly spaced ports 37 at the bottom of the gutter entirely around the tank.

When used with the activated sludge process the effluent from the aeration tanks (not shown) flows over the weir 36, through the sluice 35 to the gutter 12 which is thus filled. The effluent is discharged in radial streams from the ports 37 and directed across the moat 17 into the channels formed by the vanes 15. The effluent is thus directed horizontally toward the filtering plates 22 and is prevented from wandering or circulating around the tank. The sewage or water in flowing in straight lines across the tank has such a low velocity that the majority of finely suspended solids will be precipitated to the sludge hopper at the bottom of the tank.

As the effluent reaches the filter plates 22 it will be filtered therethrough into the central well. The clear water from the well is drawn off through the pipe 23, by opening the valve 24. The deposited sludge is pumped out by means of the air lift (pipe 31) through the pipes 27 and 28. A vertical overflow pipe 38 extends from the pipe 23 to the wall 11 immediately above the gutter 12 for relieving the gutter should the liquid back up therein due to the clogging of the central well for any reason.

Various changes in the size and shape of the different parts, as well as modifications and alterations may be made within the scope of the appended claims.

What I claim is:

1. In a sewage and water clarifier, a tank having a sludge hopper at its bottom, means for directing the effluent radially toward the center of the tank, a filtering barrier at the center of the tank, and a clear water well within the barrier.

2. In a sewage and water clarifier and filter, a tank having a sludge hopper, a filtering barrier disposed uprightly in the tank, means for supplying an effluent to the upper portion of the tank, and means located between the supply means and the barrier for directing the effluent free from obstruction toward the barrier, the barrier being sufficiently remote from the supply means to give the suspended solids opportunity to precipitate in transit therebetween.

3. In a sewage and water clarifier, a tank having a sludge hopper at its bottom and provided with a gutter around its upper portion having a curb provided with openings for discharging an effluent into the tank.

4. In a sewage and water clarifier, a tank having a sludge hopper at its bottom and provided with a gutter around its upper portion having a curb provided with openings for discharging an effluent, and means for directing the discharged effluent toward the center of the tank.

5. In a sewage and water clarifier, a tank having a sludge hopper at its bottom and provided with a gutter around its upper portion having a curb provided with openings for discharging an effluent, means for directing the discharged effluent toward the center of the tank, and a filtering column at the center of the tank.

6. In a sewage and water clarifier, a tank having a gutter at its upper end, a vertical filtering column at the center of the tank, and vertical vanes radiating from the column.

7. In a sewage and water clarifier, a tank having a gutter at its upper end, a perforated curb at the gutter, a vertical filtering column at the center of the tank, and vertical vanes radiating from the column toward the gutter.

8. In a sewage and water clarifier, a tank having a gutter at its upper end, a perforated curb at the gutter for directing an effluent into the tank, a vertical filtering column at the center of the tank receiving the effluent from the curb, means for conducting the clear effluent from the filtering column, and means for conducting sludge from the tank.

9. In a sewage and water clarifier, a tank having a sludge hopper in its bottom, a gutter around the upper portion of the tank, a perforated curb contiguous to the gutter, a central well in the column, filtering barriers at the well, vertical vanes radiating from the well, and a platform supported on the vanes.

10. As a sub-combination in a sewage and water clarifier, a tank, a plurality of radial vertical vanes in the tank, and a plurality of filtering plates superimposed between the vanes and forming a column at the center of the tank.

11. Means in a clarifying and filtering tank for radially directing the effluent from an aerating tank toward a vertical filtering column in approximately direct radial lines, whereby fine suspended solids are precipitated and the effluent is prevented from circulating.

12. The method of clarifying and filtering an effluent, which consists in directing the effluent at a low velocity in substantially straight horizontal lines toward a filtering barrier, whereby finely suspended solids are precipitated.

13. The method of clarifying and filtering an effluent, which consists in directing the effluent at a low velocity in substantially straight horizontal lines toward a filtering barrier, whereby finely suspended solids are precipitated, filtering the effluent through the barrier, and drawing off a clear liquid.

14. The method of clarifying and filtering an effluent which consists in radially directing the effluent at a low velocity in substantially straight horizontal lines toward a filtering barrier, whereby the finely suspended solids are precipitated, filtering the effluent through the barrier, drawing off a clear liquid, and separately removing the precipitated sludge.

In testimony whereof I affix my signature.

HENRY L. THACKWELL.